US006623819B2

(12) United States Patent
Missell et al.

(10) Patent No.: US 6,623,819 B2
(45) **Date of Patent: *Sep. 23, 2003**

(54) INK JET RECORDING ELEMENT

(75) Inventors: Gregory E. Missell, Penfield, NY (US); Charles L. Bauer, Webster, NY (US)

(73) Assignee: Eastman Kodak Company, Rochester, NY (US)

( * ) Notice: Subject to any disclaimer, the term of this patent is extended or adjusted under 35 U.S.C. 154(b) by 73 days.

This patent is subject to a terminal disclaimer.

(21) Appl. No.: 10/011,656

(22) Filed: Dec. 4, 2001

(65) Prior Publication Data

US 2003/0103122 A1 Jun. 5, 2003

(51) Int. Cl.$^{7}$ .................................................. B32B 3/00
(52) U.S. Cl. .................................................... 428/32.25
(58) Field of Search ................................ 428/195, 522, 428/500, 32.24, 32.25

(56) References Cited

U.S. PATENT DOCUMENTS 4,877,686 A 10/1989 Riou et al.
6,177,181 B1 * 1/2001 Hamada et al. .......... 428/304.4

* cited by examiner

*Primary Examiner*—Bruce H. Hess
*Assistant Examiner*—Michael E. Grendzynski
(74) *Attorney, Agent, or Firm*—Harold E. Cole

(57) ABSTRACT

An ink jet recording element having a substrate having thereon: a) a subbing layer of a polymeric binder and a borate or a borate derivative, the borate or borate derivative being present in an amount of from about 3 to about 50 $g/m^2$, and the weight ratio of the polymeric binder to the borate or borate derivative is from about 0.2:1 to about 2:1, and b) an image-receiving layer having particles and a cross-linkable polymer containing hydroxyl groups, the cross-linkable polymer being present in an amount of from about 20 to about 150 $g/m^2$, and the weight ratio of the cross-linkable polymer to the particles is from about 10:90 to about 30:70.

16 Claims, No Drawings

INK JET RECORDING ELEMENT

CROSS REFERENCE TO RELATED APPLICATIONS

Reference is made to commonly assigned, co-pending U.S. patent application Ser. No. 10/011,802 by Bauer et al., filed Dec. 4, 2001 entitled "Ink Jet Printing Method".

FIELD OF THE INVENTION

This invention relates to an ink jet recording element. More particularly, this invention relates to a subbing layer for an ink jet recording element.

BACKGROUND OF THE INVENTION

In a typical ink jet recording or printing system, ink droplets are ejected from a nozzle at high speed towards a recording element or medium to produce an image on the medium. The ink droplets, or recording liquid, generally comprise a recording agent, such as a dye or pigment, and a large amount of solvent. The solvent, or carrier liquid, typically is made up of water, an organic material such as a monohydric alcohol, a polyhydric alcohol or mixtures thereof.

An ink jet recording element typically comprises a support having on at least one surface thereof an ink-receiving or image-forming layer, and includes those intended for reflection viewing, which have an opaque support, and those intended for viewing by transmitted light, which have a transparent support.

It is well known that in order to achieve and maintain photographic-quality images on such an image-recording element, an ink jet recording element must:

- Be readily wetted so there is no puddling, i.e., coalescence of adjacent ink dots, which leads to non-uniform density
- Exhibit no image bleeding
- Exhibit the ability to absorb high concentrations of ink and dry quickly to avoid elements blocking together when stacked against subsequent prints or other surfaces
- Exhibit no discontinuities or defects due to interactions between the support and/or layer(s), such as cracking, repellencies, comb lines and the like
- Not allow unabsorbed dyes to aggregate at the free surface causing dye crystallization, which results in bloom or bronzing effects in the imaged areas
- Have an optimized image fastness to avoid fade from contact with water or radiation by daylight, tungsten light, or fluorescent light An ink jet recording element that simultaneously provides an almost instantaneous ink dry time and good image quality is desirable. However, given the wide range of ink compositions and ink volumes that a recording element needs to accommodate, these requirements of ink jet recording media are difficult to achieve simultaneously.

Ink jet recording elements are known that employ porous or non-porous single layer or multilayer coatings that act as suitable image receiving layers on one or both sides of a porous or non-porous support. Recording elements that use non-porous coatings typically have good image quality but exhibit poor ink dry time. Recording elements that use porous coatings typically contain colloidal particulates and have poorer image quality but exhibit superior dry times.

While a wide variety of different types of porous image-recording elements for use with ink jet printing are known, there are many unsolved problems in the art and many deficiencies in the known products which have severely limited their commercial usefulness. A major challenge in the design of a porous image-recording layer is to be able to obtain good quality, crack-free coatings with as little non-particulate matter as possible. If too much non-particulate matter is present, the image-recording layer will not be porous and will exhibit poor ink dry times.

U.S. Pat. No. 4,877,686 relates to a recording sheet for ink jet printing wherein boric acid or its derivative is used to cause gelling in a polymeric binder containing hydroxyl groups and a filler comprising particles. However, there is a problem with this element in that the amount of boric acid used does not provide an element which, when printed with an ink jet printer, will have a fast dry time without cracking.

It is an object of this invention to provide an ink jet recording element that has a fast dry time when used in ink jet printing. It is another object of this invention to provide a porous recording element that has good coating quality, especially reduced cracking. It is still another object of this invention to provide an ink jet recording element that exhibits good image quality after printing.

SUMMARY OF THE INVENTION

These and other objects are achieved in accordance with the invention which comprises an ink jet recording element comprising a substrate having thereon:

a) a subbing layer comprising a polymeric binder and a borate or a borate derivative, the borate or borate derivative being present in an amount of from about 3 to about 50 g/m$^2$, and the weight ratio of the polymeric binder to the borate or borate derivative is from about 0.2:1 to about 2:1, and b) an image-receiving layer comprising particles and a cross-linkable polymer containing hydroxyl groups, the cross-linkable polymer being present in an amount of from about 20 to about 150 g/m$^2$, and the weight ratio of the cross-linkable polymer to the particles is from about 10:90 to about 30:70.

The ink jet recording element of the invention has good coating and image quality and a fast dry time when printed in an ink jet printer.

DETAILED DESCRIPTION OF THE INVENTION

The polymeric binder in the subbing layer employed in the invention is preferably a water soluble or water dispersible polymer such as poly(vinyl alcohol), poly(vinyl pyrrolidone), gelatin, a cellulose ether, a poly(oxazoline), a poly(vinylacetamide), partially hydrolyzed poly(vinyl acetate/vinyl alcohol), poly(acrylic acid), poly(acrylamide), poly(alkylene oxide), a sulfonated or phosphated polyester or polystyrene, casein, zein, albumin, chitin, chitosan, dextran, pectin, a collagen derivative, collodian, agar-agar, arrowroot, guar, carrageenan, tragacanth, xanthan, rhamsan and the like, a latex such as poly(styrene-co-butadiene), a polyurethane latex, a polyester latex, or a poly(acrylate), poly(methacrylate), poly(acrylamide) or copolymers thereof. In a preferred embodiment, the polymeric binder is a sulfonated polyester dispersion, such as AQ29® (Eastman Chemical Co.), gelatin, a polyurethane or poly(vinyl pyrrolidone).

The polymeric binder for the subbing layer is preferably used in an amount of from about 1 to about 50 g/m$^2$, preferably from about 1 to about 20 g/m$^2$.

The borate or borate derivative employed in the subbing layer of the ink jet recording element of the invention may be, for example, borax, sodium tetraborate, boric acid, phenyl boronic acid, or butyl boronic acid. As noted above, the borate or borate derivative is used in an amount of from about 3 to about 50 g/m$^2$, preferably from about 3 to about 10 g/m$^2$. It is believed that upon coating, the borate or borate derivative in the subbing layer diffuses into the image-receiving layer to cross-link the cross-linkable binder in the image-receiving layer.

The particles employed in the image-receiving layer of the invention may be either inorganic or organic. Inorganic particles which may be used include, for example, comprise metal oxides, hydrated metal oxides, boehmite, clay, calcined clay, calcium carbonate, aluminosilicates, zeolites or barium sulfate. In a preferred embodiment, the metal oxide is silica, alumina, zirconia or titania.

Organic particles which may be used in the invention include polymeric particles such as, for example, particles made from acrylic resins, styrenic resins, or cellulose derivatives, such as cellulose acetate, cellulose acetate butyrate, cellulose propionate, cellulose acetate propionate, and ethyl cellulose; polyvinyl resins such as polyvinyl chloride, copolymers of vinyl chloride and vinyl acetate and polyvinyl butyral, polyvinyl acetal, ethylene-vinyl acetate copolymers, ethylene-vinyl alcohol copolymers, and ethylene-allyl copolymers such as ethylene-allyl alcohol copolymers, ethylene-allyl acetone copolymers, ethylene-allyl benzene copolymers, ethylene-allyl ether copolymers, ethylene acrylic copolymers and polyoxy-methylene; polycondensation polymers, such as, polyesters, including polyethylene terephthalate, polybutylene terephthalate, polyurethanes and polycarbonates. Examples of organic particles useful in the invention are disclosed and claimed in U.S. patent application Ser. No. 09/458,401, filed Dec. 10, 1999; Ser. No. 09/608,969, filed Jun. 30, 2000; Ser. No. 09/607,417, filed Jun. 30, 2000; Ser. No. 09/608,466 filed Jun. 30, 2000; Ser. No. 09/607,419, filed Jun. 30, 2000; and Ser. .No. 09/822,731, filed Mar. 30, 2001; the disclosures of which are hereby incorporated by reference. In a preferred embodiment of the invention, the mean particle size of the particles is up to about 5 $\mu$m. In another preferred embodiment, the particles are present in said image-receiving layer in an amount of from about 50 to about 350 g/m$^2$.

The cross-linkable polymer containing hydroxyl groups employed in the image-receiving layer may be, for example, poly(vinyl alcohol), partially hydrolyzed poly(vinyl acetate/vinyl alcohol), copolymers containing hydroxyethylmethacrylate, copolymers containing hydroxyethylacrylate, copolymers containing hydroxypropylmethacrylate, hydroxy cellulose ethers such as hydroxyethylcellulose, etc. In a preferred embodiment, the cross-linkable polymer containing hydroxyl groups is poly(vinyl alcohol) or partially hydrolyzed poly(vinyl acetate/vinyl alcohol).

An additional polymeric binder, such as any of the polymeric binders listed above for the subbing layer, may also be added to the image-receiving layer along with the cross-linkable polymer, if desired.

The amount of binder used in the image-receiving layer should be sufficient to impart cohesive strength to the ink jet recording element, but should also be minimized so that the interconnected pore structure formed by the particles is not filled in by the binder.

In addition to the image-receiving layer, the recording element of the invention may also contain a layer on top of the image-receiving layer, the function of which is to provide gloss. Materials useful for this layer include sub-micron inorganic particles and/or polymeric binder.

The support for the ink jet recording element used in the invention can be any of those usually used for ink jet receivers, such as resin-coated paper, paper, polyesters, or microporous materials such as polyethylene polymer-containing material sold by PPG Industries, Inc., Pittsburgh, Pa. under the trade name of Teslin®, Tyvek® synthetic paper (DuPont Corp.), impregnated paper such as Duraform®, and OPPalyte® films (Mobil Chemical Co.) and other composite films listed in U.S. Pat. No. 5,244,861. Opaque supports include plain paper, coated paper, synthetic paper, photographic paper support, melt-extrusion-coated paper, and laminated paper, such as biaxially oriented support laminates. Biaxially oriented support laminates are described in U.S. Pat. Nos. 5,853,965; 5,866,282; 5,874,205; 5,888,643; 5,888,681; 5,888,683; and 5,888,714, the disclosures of which are hereby incorporated by reference. These biaxially oriented supports include a paper base and a biaxially oriented polyolefin sheet, typically polypropylene, laminated to one or both sides of the paper base. Transparent supports include glass, cellulose derivatives, e.g., a cellulose ester, cellulose triacetate, cellulose diacetate, cellulose acetate propionate, cellulose acetate butyrate; polyesters, such as poly(ethylene terephthalate), poly(ethylene naphthalate), poly(1,4-cyclohexanedimethylene terephthalate), poly(butylene terephthalate), and copolymers thereof; polyimides; polyamides; polycarbonates; polystyrene; polyolefins, such as polyethylene or polypropylene; polysulfones; polyacrylates; polyetherimides; and mixtures thereof The papers listed above include a broad range of papers, from high end papers, such as photographic paper to low end papers, such as newsprint.

The support used in the invention may have a thickness of from about 50 to about 500 $\mu$m, preferably from about 75 to 300 $\mu$m. Antioxidants, antistatic agents, plasticizers and other known additives may be incorporated into the support, if desired.

In order to improve the adhesion of the image-receiving layer to the support, the surface of the support may be subjected to a corona-discharge treatment prior to applying the subbing layer.

The above coating composition can be coated either from water or organic solvents, however water is preferred. The total solids content should be selected to yield a useful coating thickness in the most economical way, and for particulate coating formulations, solids contents from 10–40 wt. % are typical.

Coating compositions employed in the invention may be applied by any number of well known techniques, including dip-coating, wound-wire rod coating, doctor blade coating, gravure and reverse-roll coating, slide coating, bead coating, extrusion coating, curtain coating and the like. Known coating and drying methods are described in further detail in Research Disclosure no. 308119, published Dec. 1989, pages 1007 to 1008. Slide coating is preferred, in which the base layers and overcoat may be simultaneously applied. After coating, the layers are generally dried by simple evaporation, which may be accelerated by known techniques such as convection heating.

The coating composition may be applied to one or both substrate surfaces through conventional pre-metered or post-metered coating methods such as blade, air knife, rod, roll coating, etc. The choice of coating process would be determined from the economics of the operation and in turn, would determine the formulation specifications such as coating solids, coating viscosity, and coating speed.

The image-receiving layer thickness may range from about 1 to about 60 $\mu$m, preferably from about 5 to about 40 $\mu$m.

After coating, the ink jet recording element may be subject to calendering or supercalendering to enhance surface smoothness. In a preferred embodiment of the invention, the ink jet recording element is subject to hot soft-nip calendering at a temperature of about 65° C. and a pressure of 14000 kg/m at a speed of from about 0.15 m/s to about 0.3 m/s.

In order to impart mechanical durability to an ink jet recording element, additional crosslinkers which further act upon the cross-linkable binder discussed above may be added in small quantities. Such an additive improves the cohesive strength of the layer. Crosslinkers such as carbodiimides, polyfunctional aziridines, aldehydes, isocyanates, epoxides, polyvalent metal cations, and the like may all be used.

To improve colorant fade, UV absorbers, radical quenchers or antioxidants may also be added to the image-receiving layer as is well known in the art. Other additives include pH modifiers, adhesion promoters, rheology modifiers, surfactants, biocides, lubricants, dyes, optical brighteners, matte agents, antistatic agents, etc. In order to obtain adequate coatability, additives known to those familiar with such art such as surfactants, defoamers, alcohol and the like may be used. A common level for coating aids is 0.01 to 0.30 wt. % active coating aid based on the total solution weight. These coating aids can be nonionic, anionic, cationic or amphoteric. Specific examples are described in MCCUTCHEON's Volume 1: Emulsifiers and Detergents, 1995, North American Edition.

Ink jet inks used to image the recording elements of the present invention are well-known in the art. The ink compositions used in ink jet printing typically are liquid compositions comprising a solvent or carrier liquid, dyes or pigments, humectants, organic solvents, detergents, thickeners, preservatives, and the like. The solvent or carrier liquid can be solely water or can be water mixed with other water-miscible solvents such as polyhydric alcohols. Inks in which organic materials such as polyhydric alcohols are the predominant carrier or solvent liquid may also be used. Particularly useful are mixed solvents of water and polyhydric alcohols. The dyes used in such compositions are typically water-soluble direct or acid type dyes. Such liquid compositions have been described extensively in the prior art including, for example, U.S. Pat. Nos. 4,381,946; 4,239,543 and 4,781,758, the disclosures of which are hereby incorporated by reference.

Although the recording elements disclosed herein have been referred to primarily as being useful for ink jet printers, they also can be used as recording media for pen plotter assemblies. Pen plotters operate by writing directly on the surface of a recording medium using a pen consisting of a bundle of capillary tubes in contact with an ink reservoir.

The following example is provided to illustrate the invention.

EXAMPLE

The following elements were prepared with the subbing layers listed:

Control Element C-1 (Low Amount of Borax)

A 10% by weight solution of water, borax (sodium tetraborate decahiydrate) and a sulfonated polyester dispersion AQ29® (Eastman Chemical Co.) with a coating surfactant Olin10G®, with the borax to polyester binder ratio being 33:67, was rod coated on a corona-discharge treated resin coated paper for a total dry lay-down of 1.5 g/m$^2$, giving a dry lay-down of borax of 0.5 g/m$^2$ and a polyester binder dry lay-down of 1.0 g/m$^2$. The coating was dried in a oven at 40° C. for 20 minutes.

Control Element C-2 (Low Amount of Borax and Binder)

This element was prepared the same as C-1 except that the dry lay-down of the borax was 1.0 g/m$^2$ and the dry lay-down of the polyester binder was 0.5 g/m$^2$.

Control Element C-3 (Low Amount of Borax and Binder)

This element was prepared the same as C-1 except that the dry lay-down of the borax was 1.0 g/m$^2$ and the dry lay-down of the polyester binder was 1.0 g/l$^2$.

Control Element C-4 (High Amount of Borax)

This element was prepared the same as C-1 except that the dry lay-down of the borax was 12.0 g/m$^2$ and the dry lay-down of the polyester binder was 12.0 g/m$^2$.

Control Element C-5 (High Amount of Binder)

This element was prepared the same as C-1 except that the dry lay-down of the borax was 10.0 g/m$^2$ and the dry lay-down of the polyester binder was 25.0 g/m$^2$.

Element 1 of the Invention

This element was prepared the same as C-1 except that the dry lay-down of the borax was 5.0 g/m$^2$ and the dry lay-down of the polyester binder was 1.0 g/m$^2$.

Element 2 of the Invention

This element was prepared the same as C-1 except that the dry lay-down of the borax was 5.0 g/m$^2$ and the dry lay-down of the polyester binder was 5.0 g/m$^2$.

Element 3 of the Invention

This element was prepared the same as C-1 except that the dry lay-down of the borax was 7.0 g/m$^2$ and the dry lay-down of the polyester binder was 71.0 g/m$^2$.

Element 4 of the Invention

This element was prepared the same as C-1 except that the dry lay-down of the borax was 10.0 g/m$^2$ and the dry lay-down of the polyester binder was 10.0 g/m$^2$.

Element 5 of the Invention

This element was prepared the same as C-1 except that the dry lay-down of the borax was 10.0 g/m$^2$ and the dry lay-down of the polyester binder was $^{20.0}$ g/m$^2$.

Image-receiving Layer

The above elements with the subbing layers described were then overcoated with an image-receiving layer using a blade coater and an 18% by weight solution of porous polymeric particles, poly(ethylene glycol dimethacrylate), 0.18 $\mu$m and a poly(vinyl alcohol) binder, AH22 from Nippon Gohsei, with the ratio of particles to poly(vinyl alcohol) being 80:20, at a dry lay-down of about 43 g/m$^2$. A coating surfactant Olin10G® was also used at about 0.1% of the total solution weight. The coatings were dried in a oven at 40° C. for 20 min.

Testing

Each element was imaged using an Epson 870 ink jet printer and ink jet inks, Cartridge No.T007 (black) and T008 (color), and tested for dry time. The dry time test is a smudge test where immediately after printing, a color patch of cyan, magenta, yellow, red, green, blue, and black are rubbed with a latex glove and the amount of smudge recorded according to the scale in Table 1.

TABLE 1

| Rating | Dry Time Observations |
|---|---|
| 1 | Instant dry, no smudging |
| 2 | Very slight smudging in red, green or blue, none in cyan, magenta, yellow, black |
| 3 | Some smudging in red, green or blue, only slight smudging in cyan, magenta, yellow, black. No puddling of ink |
| 4 | Smudging in all Colors and slight puddling |
| 5 | Heavy smudging in all Colors and heavy puddling |

Each element, after printing, was then rated for cracking and rated Table 2.

TABLE 2

| Rating | Cracking Observations |
|---|---|
| 1 | No visible cracks under magnification |
| 2 | Slight micro-cracks under 10X magnification |
| 3 | Very slight visible cracks under no magnification |
| 4 | Heavy cracking, some flaking |
| 5 | Heavy cracking, coating flaking off |

The following results were obtained:

TABLE 3

| Element | Borax (g/m$^2$) | Binder (g/m$^2$) | Cracking Rating | Dry time Rating |
|---|---|---|---|---|
| C-1 | 0.5 | 1 | 5 | 4 |
| C-2 | 1 | 0.5 | No coating* | — |
| C-3 | 1 | 1 | 3 | 3 |
| C-4 | 12 | 12 | 4 | 2 |
| C-5 | 10 | 25 | 4 | 4 |
| 1 | 5 | 1 | 2 | 2 |
| 2 | 5 | 5 | 2 | 1 |
| 3 | 7 | 7 | 2 | 1 |
| 4 | 10 | 10 | 2 | 1 |
| 5 | 10 | 20 | 3 | 1 |

*When the subbing layer coating was dried, it turned to a powder and did not adhere to the resin paper. No image receiving layer was coated.

The above results show that use of the subbing layer in accordance with the invention provided elements which had better dry time and less cracking than the control elements.

This invention has been described with particular reference to preferred embodiments thereof but it will be understood that modifications can be made within the spirit and scope of the invention.

What is claimed is:

1. An ink jet recording element comprising a substrate having thereon:

a) a subbing layer comprising a polymeric binder and a borate or a borate derivative, said borate or borate derivative being present in an amount of from about 3 to about 50 g/m$^2$, and the weight ratio of said polymeric binder to said borate or borate derivative is from about 0.2:1 to about 2:1; and b) an image-receiving layer comprising particles and a cross-linkable polymer containing hydroxyl groups, said cross-linkable polymer being present in an amount of from about 20 to about 150 g/m$^2$, and the weight ratio of said cross-linkable polymer to said particles is from about 10:90 to about 30:70.

2. The recording element of claim 1 wherein said polymeric binder in said subbing layer comprises a water-soluble or water-dispersible polymer.

3. The recording element of claim 1 wherein said polymeric binder in said subbing layer comprises a sulfonated polyester dispersion, gelatin, a polyurethane or poly(vinyl pyrrolidone).

4. The recording element of claim 1 wherein said polymeric binder in said subbing layer comprises a sulfonated polyester dispersion.

5. The recording element of claim 1 wherein said polymeric binder is present in said subbing layer in an amount of from about 1 to about 50 g/m$^2$.

6. The recording element of claim 1 wherein said polymeric binder is present in said subbing layer in an amount of from about 1 to about 20 g/m$^2$.

7. The recording element of claim 1 wherein said borate or borate derivative is borax, sodium tetraborate, boric acid, phenyl boronic acid, or butyl boronic acid.

8. The recording element of claim 1 wherein said borate or borate derivative is present in an amount of from about 3 to about 50 g/m$^2$.

9. The recording element of claim 1 wherein said borate or borate derivative is present in an amount of from about 3 to about 10 g/m$^2$.

10. The recording element of claim 1 wherein said particles are present in said image-receiving layer in an amount of from about 50 to about 350 g/m$^2$.

11. The recording element of claim 1 wherein said particles are inorganic or organic.

12. The recording element of claim 11 wherein said inorganic particles comprise metal oxides, hydrated metal oxides, boehmite, clay, calcined clay, calcium carbonate, aluminosilicates, zeolites or barium sulfate.

13. The recording element of claim 12 wherein said metal oxide is silica, alumina, zirconia or titania.

14. The recording element of claim 11 wherein said organic particles are polymeric particles.

15. The recording element of claim 1 wherein said cross-linkable polymer containing hydroxyl groups in said image-receiving layer comprises poly(vinyl alcohol), partially hydrolyzed poly(vinyl acetate/vinyl alcohol), copolymers containing hydroxyethylmethacrylate, copolymers containing hydroxyethylacrylate, copolymers containing hydroxypropylmethacrylate, or hydroxy cellulose ethers.

16. The recording element of claim 1 wherein said cross-linkable polymer containing hydroxyl groups in said image-receiving layer comprises poly(vinyl alcohol) or partially hydrolyzed poly(vinyl acetate/vinyl alcohol).

* * * * *